United States Patent [19]
Gefter et al.
[11] Patent Number: 4,988,437
[45] Date of Patent: Jan. 29, 1991

[54] IN-LINE LEAF TRAP

[75] Inventors: Alexander A. Gefter, San Francisco; Kenneth N. Marshall, Novato, both of Calif.

[73] Assignee: Arneson Products, Inc., Corte Madera, Calif.

[21] Appl. No.: 423,963

[22] Filed: Oct. 19, 1989

[51] Int. Cl.$^5$ .......... B01D 35/02
[52] U.S. Cl. .......... 210/237; 210/416.2; 210/445; 210/446; 210/453
[58] Field of Search .......... 210/169, 232, 237, 238, 210/416.2, 445, 446, 448, 450, 453, 454, DIG. 17, 497.01

[56] References Cited

U.S. PATENT DOCUMENTS 3,360,128 12/1967 Federline .......... 210/232 X
3,456,799 7/1969 Musial .......... 210/448
3,841,489 10/1974 Combest et al. .......... 210/448 X
3,864,262 2/1975 Lang et al. .......... 210/169
4,064,586 12/1977 Caron .......... 210/169 X
4,356,791 11/1982 Ward et al. .......... 210/445 X
4,476,023 10/1984 Horikoshi et al. .......... 210/446
4,654,141 3/1987 Frentzel .......... 210/232

OTHER PUBLICATIONS

Rainbow Lifegard Products, Inc., one-page advertisement (no date) for Leaf Traps.

*Primary Examiner*—Charles Hart
*Attorney, Agent, or Firm*—Limbach, Limbach & Sutton

[57] ABSTRACT

An in-line leaf trap (100) is disclosed having a housing defined by a main body (112) and a separable lid (114). A filter (116, 118) is provided in the leaf trap for gathering debris. A locking ring (124) is provided having an inner threaded region (126) engagable with threads provided on the main body of the housing to seal the housing. The locking ring (124) includes a plurality of spokes (128) extending between the ring and central cylindrical yoke (130). The spokes are provided to facilitate rotation of the locking ring with one hand. In the preferred embodiment, a handle (190) is provided on the main body.

7 Claims, 2 Drawing Sheets

IN-LINE LEAF TRAP

TECHNICAL FIELD

The subject invention relates to a leaf trap which is connectable in-line with the vacuum hose used for cleaning a swimming pool. The subject leaf trap can be serviced with much greater ease than prior art devices.

BACKGROUND OF THE INVENTION

FIG. 1 illustrates a leaf trap 10 found in the prior art. This leaf trap is of the type marketed by Rainbow Lifeguard Products. Trap 10 includes a housing having main body 12 and a lid 14. A pair of opposed fittings 16 and 18 are formed on the lid and attached to the main body, respectively. A mesh bag 18 is receivable within the main body 12 for capturing leaves. In use, a hose is connected between fitting 18 and the source of vacuum or suction. Fitting 16 is connected to another hose which is in turn connected to a vacuum type pool cleaner or traditional hand operated vacuum device. The trap 10 functions to capture leaves, twigs and other debris as the pool water is sucked through the trap on the way to the filter pump. The trap prevents the debris from reaching and clogging the pump.

The prior art trap 10 also includes a locking ring 20 for drawing the lid 14 and main body 12 into sealing engagement. Ring 20 includes internal threads 22 which engage with threads 24 on the lid. When the ring is slid up on the main body it can be rotated in a manner to draw the lid into sealing engagement with the main body 12. An O-ring 26 is provided to enhance the sealing. As also illustrated in FIG. 1, the main body 12 includes four keys 28. The locking ring includes four notches 30 which allow the ring to pass over the keys 28 as long as the ring is properly aligned. The keys are intended to help prevent the ring from falling off the main body when it has been disengaged from the lid.

In use, the inner mesh bag 18 collects debris and must be emptied at periodic intervals. To accomplish this task, the user must lift the leaf trap out of the water and disengage ring 20. Because the diameter of the ring is about six inches, removal usually requires two hands. The user is therefore forced to brace the filter housing between his legs and rotate the locking ring with both hands. As can be appreciated, since the leaf trap has been in the pool, it will be wet, resulting in a messy and awkward procedure. In addition, as the ring is rotated, the keys can become aligned with the notches such that the force of gravity will cause the ring to drop off the main body requiring reassembly. It would be desirable to provide a leaf trap which can be serviced in a more convenient manner.

Accordingly, it is an object of the subject invention to provide a new and improved in-line leaf trap.

It is another object of the subject invention to provide an improved in-line leaf trap which can be more readily serviced

SUMMARY OF THE INVENTION

In accordance with these and many other objects, the subject invention provides an in-line leaf trap which is connectable to the vacuum hose of a swimming pool. The leaf trap is defined by a housing having a main body and separable lid. A filter is receivable in the housing for capturing debris. A locking ring is provided which is configured to fit over the lid and includes a threaded region which is engagable with a threaded region formed on the main body. In the preferred embodiment of the subject invention the locking ring includes a plurality of spokes which extend from the ring to a yoke. The spokes define a handle for simplifying the removal of the locking ring. The main body can also be provided with a handle so that the housing can be held while the user twists the locking ring off by grasping one of the spokes. As will be seen, the user can hold the leaf trap by the handle with one hand and remove the locking ring with the other hand. The inner filter bag can then be easily removed and emptied.

Further objects and advantages of the subject invention will become apparent from the following detailed description taken in conjunction with the drawings in which:

DETAILED DESCRIPTION OF THE PREFERRED EMBODIMENTS

Figure 1:
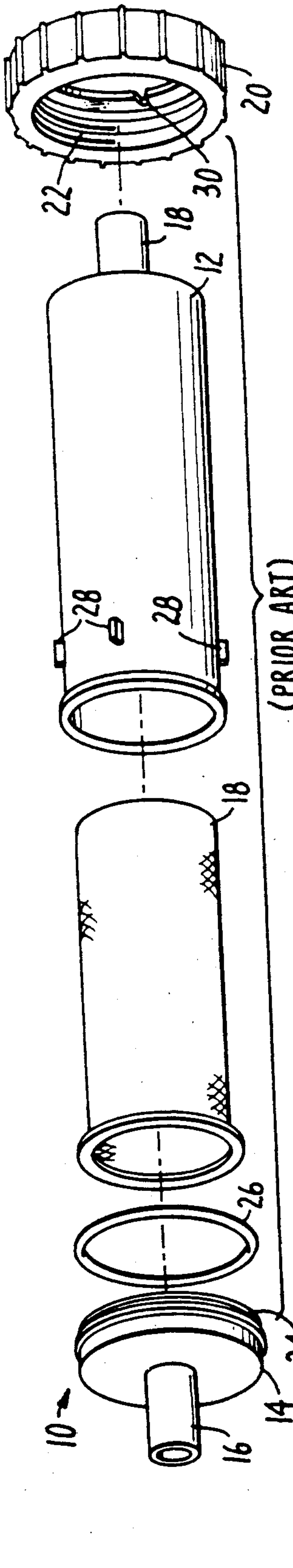
FIG. 1 is an exploded perspective view of a leaf trap found in the prior art.
Figure 2:
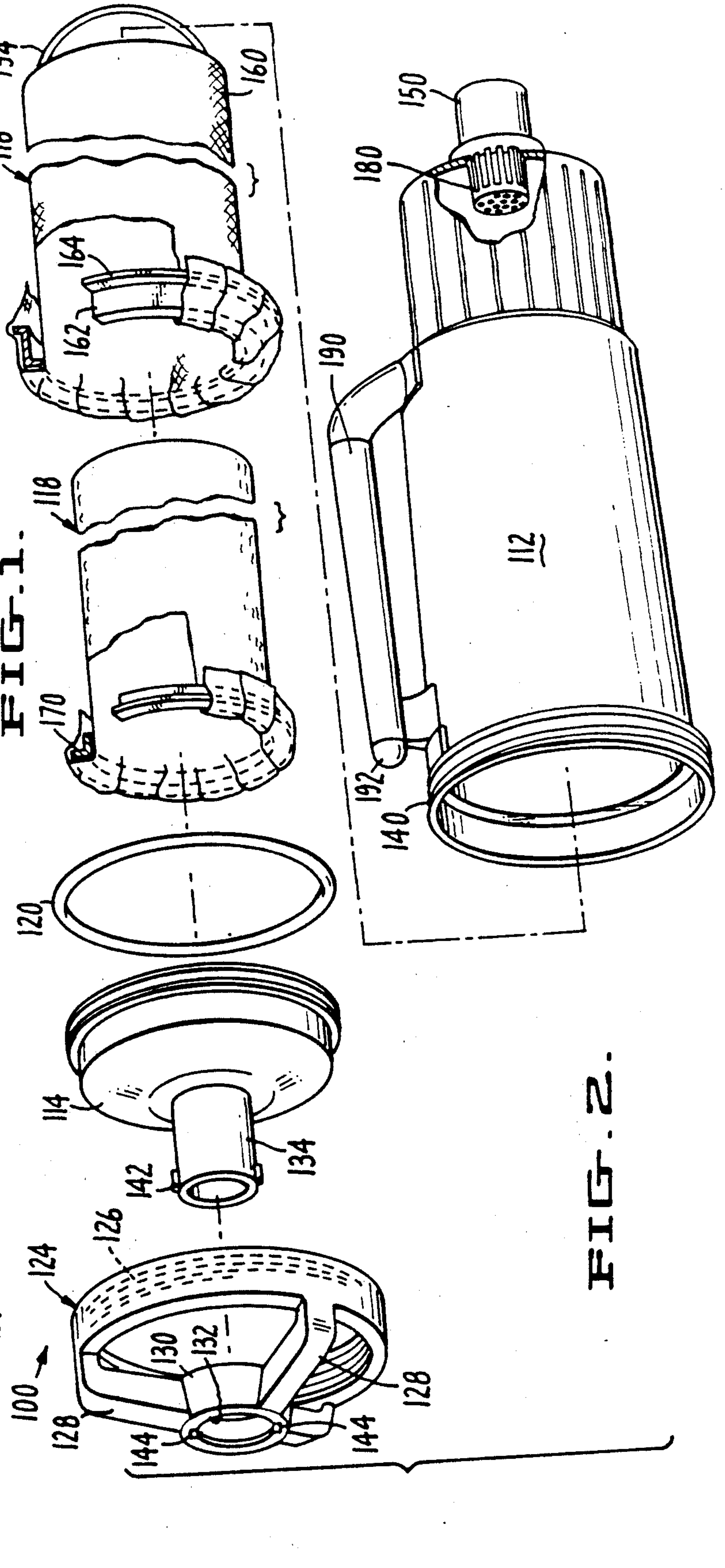
FIG. 2 is an exploded perspective view of the leaf trap formed in accordance with the subject invention.
Figure 4:
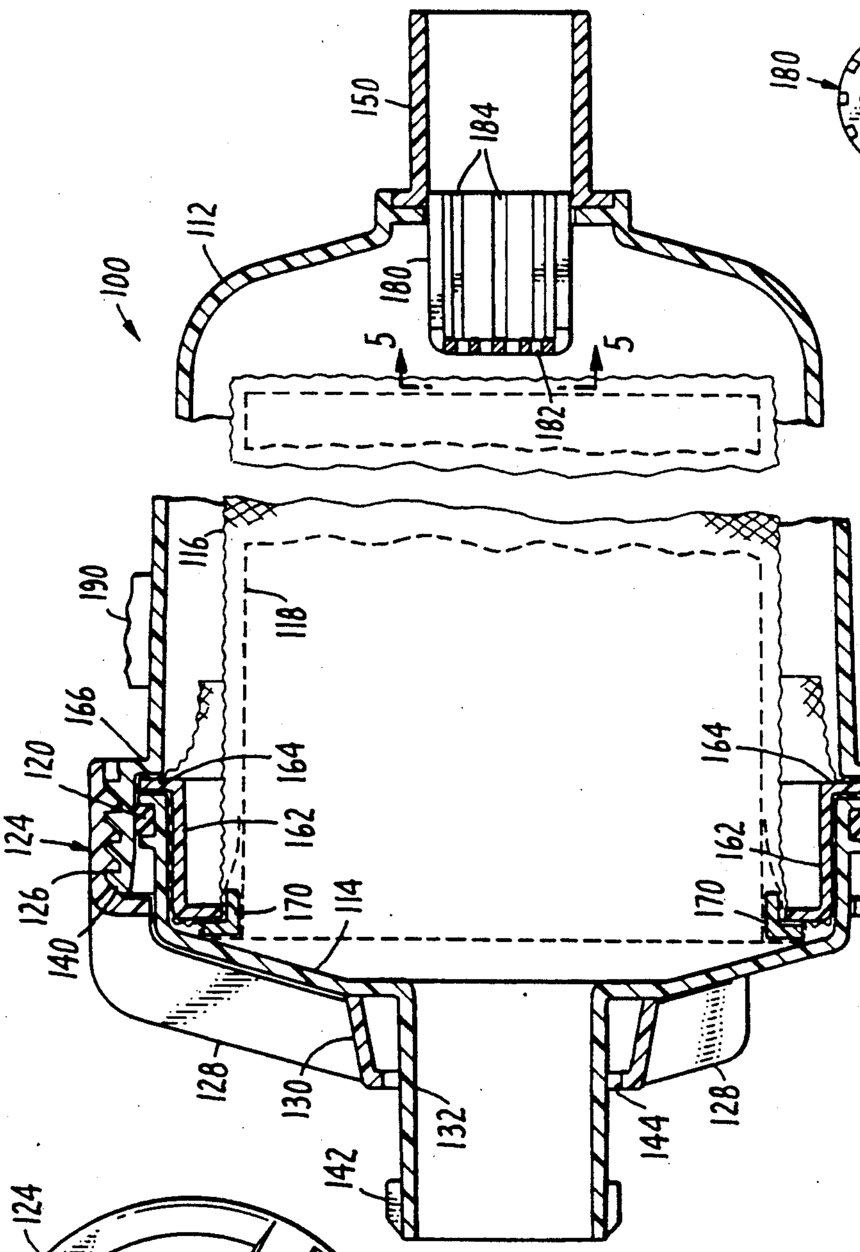
FIG. 4 is a composite cross-sectional view of the leaf trap of the subject invention taken along a line 4—4 of FIG. 3.
Figure 3:
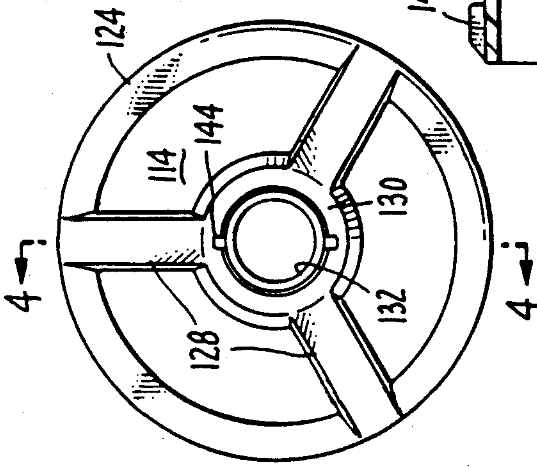
FIG. 3 is an end elevational view illustrating the locking ring and lid.

Referring now to FIGS. 2 through 4, there is illustrated the leaf trap 100 of the subject invention. The leaf trap 100 includes a housing defined by a main body 112 and a separable lid 114. An O-ring 120 is provided to enhance the sealing between the elements. The housing is generally cylindrical and is configured to receive filter elements 116 and 118. Preferably, the housing is formed from a clear plastic so that the amount of debris that is collected can be visually monitored.

The positive engagement between the lid 114 and the main body 112 is created by the use of a novel locking ring 124. The locking ring 124 includes a cylindrical segment having a threaded region 126 on the radially inner surface thereof. Locking ring further includes a plurality of spokes 128 designed to facilitate the manual rotation of the ring. The spokes 128 are connected to one edge surface of the ring and extend upwardly to a concial yoke 130. Yoke 130 includes a central aperture 132 which is receivable over a fitting 134 formed in lid 114.

Fitting 134 is provided with an opposed pair of keys 142 to prevent the ring from being easily removed from the lid. A pair of opposed slots 144 are provided on the radial inner surface of yoke 130 and can be aligned with the keys 142 when initially mounting the locking ring onto the lid.

Threads 126 of ring 124 are engagable with threads 140 formed on the outer surface of main body 112 near lid 114. As best illustrated in FIG. 4, the engagement between threads 126 and 140 serves to draw the lid 114 towards the main body sealing the housing. Once the housing is sealed, it may be connected in-line with the vacuum hoses associated with a swimming pool. More specifically, the hose which is connected to the vacuum cleaner device is connected to fitting 134. The hose which is in direct communication with the suction pump is connected to fitting 150 located at the opposed end of main body 112.

When the vacuum system is operating, water will be drawn into the housing through fitting 134 past the filter bags 116 and 118 and out through fitting 150. Any debris which is in the water flow will be captured by one of the two bags.

Bag 116 is the primary filter bag and is typically formed of polyester mesh 160. The open end of bag 116 is supported by a radial ring 162 which is generally S-shaped in cross-section as seen in FIG. 4. A radially projecting portion 164 of support ring 162 is captured between lid 114 and a radial shelf 166 formed on the inner surface of the main body 112. The leaf trap may be operated with only the primary filter bag 116. In this case, the user will be required to empty the bag when it is full and return it to the trap.

In the preferred embodiment, an additional disposable mesh bag 118 is also provided. If a disposable bag 118 is provided, the user can simply remove the bag and throw it away when it is full. The open end of the inner bag 118 is supported by a ring 170. As seen in FIG. 4, ring 170 is designed to have a diameter slightly larger than the radial inner diameter of support ring 162 so that it may rest thereon.

Figure 5:
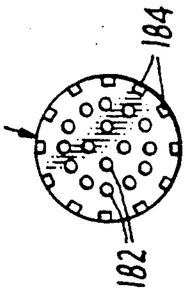
FIG. 5 is a view of the screen of the leaf trap taken along the lines 5—5 of FIG. 4.

As seen in FIGS. 4 and 5, the lower end of the housing is further provided with a screen 180. Screen 180 is cap-like in configuration and includes a plurality of through-holes 182 along with a plurality of axially extending slots 184. The screen is provided so that if the filter bag should break, water flow can be maintained while debris is still prevented from leaving the trap. In this manner, clogs or other breakdown of the pump can be prevented.

As seen in FIG. 2, the main body 112 of the housing is preferably provided with a handle 190. Handle 190 is hollow and is sealed with a cap 192. The sealed hollow handle traps air and tends to cause the handle to float near the surface allowing the user to easily lift the trap out of the water.

As noted above, in use, water will flow through the trap such that debris will be collected in filter bags 116 or 118. When the user observes that the bag is getting full and needs to be emptied or replaced, the device is easily lifted out of the water by the flotation handle 190 and the hoses can be removed from the fittings. While the user holds the handle 190 with one hand, the other hand can be used to rotate the locking ring 124 in a counterclockwise direction by grabbing any one of the spokes 128 and twisting the ring. Once the threads 126 become disengaged from the threads 140, the lid 114 can be separated from the main body 112. Since the ring is positioned on the lid, gravity will tend to keep the two parts engaged.

Once the lid is separated, the user can either remove the filter bag 116 for cleaning or dispose of filter bag 118. As shown in FIG. 2, filter bag 118 can be provided with a fabric handle 194 to facilitate shaking debris directly out of bag 118 or shaking the disposable filter bag 116 out of bag 118. Once this process is complete, a new filter bag 118 or the cleaned filter bag 116 is reinserted and the lid is placed on the main body. The locking ring is then rotated in a clockwise direction using the spokes 128 until the lid is forced into sealing engagement with the main body. In this manner, the user can service the device in a simple manner without becoming wet or dirty.

While the subject invention has been described with reference to the preferred embodiments, various other changes and modifications could be made therein by one skilled in the art without varying from the scope and spirit of the subject invention as defined by the appended claims.

We claim:

1. A leaf trap connectable in-line with a vacuum hose of a swimming pool comprising:

a housing including a main body and a separable lid, with the main body including a cylindrical threaded region adjacent the lid, said housing including a pair of opposed fittings located in said lid and main body for connection to said vacuum hose, with the fitting on said lid including a key means, said housing for receiving a filter means for capturing debris passing through said housing; and a locking ring configured to fit over said lid and including a threaded region engagable with said threaded region on the main body of the housing to seal the housing, said locking ring further including a yoke configured to be mounted over the fitting formed on said lid, said yoke including complementary slots which can be aligned with said key means when installing said locking ring in place over said lid.

2. A leaf trap as recited in claim 1 wherein said locking ring further includes a handle means to facilitate rotation of said ring.

3. A leaf trap as recited in claim 2 wherein said handle means is defined by a plurality of spokes.

4. A leaf trap as recited in claim 1 wherein said main body includes a radial shelf on the inner surface thereof and opposed to said threaded portion, and wherein said filter means includes a radial ring which rests on said shelf and is clamped into sealing relationship by said lid.

5. A leaf trap as recited in claim 1 wherein said main body further includes a safety screen in communication with said fitting.

6. A leaf trap connectable in-line with a vacuum hose of a swimming pool comprising:

a housing including a main body and a separable lid, with the main body including a cylindrical threaded region adjacent the lid, said housing including a pair of opposed fittings located in said lid and main body for connection to said vacuum hose, said housing for receiving a filter means for capturing debris passing through said housing and wherein said main body further includes a carrying handle; and a locking ring configured to fit over said lid and including a threaded region engagable with said threaded region on the main body of the housing to seal the housing.

7. A leaf trap as recited in claim 6 wherein said carrying handle is a sealed hollow member.

* * * * *